United States Patent [19]

Eichler et al.

[11] Patent Number: 5,246,031
[45] Date of Patent: Sep. 21, 1993

[54] FLOW-CONTROL VALVE ESPECIALLY FOR GASIFIED LIQUIDS

[75] Inventors: Walter Eichler, Gerstetten; Bringfried Peglow, Herbrechtingen, both of Fed. Rep. of Germany

[73] Assignees: The Coca-Cola Company, Altanta, Ga.; Bosch-Siemens Hausgerate GmbH, Fed. Rep. of Germany

[21] Appl. No.: 918,146

[22] Filed: Jul. 24, 1992

Related U.S. Application Data

[63] Continuation of Ser. No. 745,390, Aug. 15, 1991, abandoned.

[30] Foreign Application Priority Data

Aug. 16, 1990 [DE] Fed. Rep. of Germany ....... 4025983

[51] Int. Cl.⁵ ............................ F16K 7/17; A47J 31/41
[52] U.S. Cl. ..................................... 137/508; 137/859
[58] Field of Search .............................. 137/508, 859

[56] References Cited

U.S. PATENT DOCUMENTS

| | | | |
|---|---|---|---|
| 1,038,527 | 9/1912 | Coleman | 137/508 X |
| 2,623,331 | 12/1952 | Greening | 137/508 |
| 2,684,081 | 7/1954 | Chace | 137/859 X |
| 3,973,410 | 8/1976 | Putman | 137/859 X |
| 4,714,458 | 12/1987 | Hooven | 137/508 X |

FOREIGN PATENT DOCUMENTS

3430953 3/1986 Fed. Rep. of Germany .

*Primary Examiner*—John Rivell
*Attorney, Agent, or Firm*—Birch, Stewart, Kolasch & Birch

[57] ABSTRACT

A flow-control valve especially for gasified liquids, for dispensing portions of carbonated water from a storage container for mixing with beverage concentrates in a beverage-vending machine comprises a valve housing, the interior of which broadens from an inlet opening to a chamber in which a membrane with an orifice is arranged orthogonally to the direction of the inflowing water. Water flowing into the chamber passes through the orifice in the membrane and displaces the latter toward a pin which is arranged on the opposite side of the membrane to the inlet opening adjacent to the orifice.

14 Claims, 1 Drawing Sheet

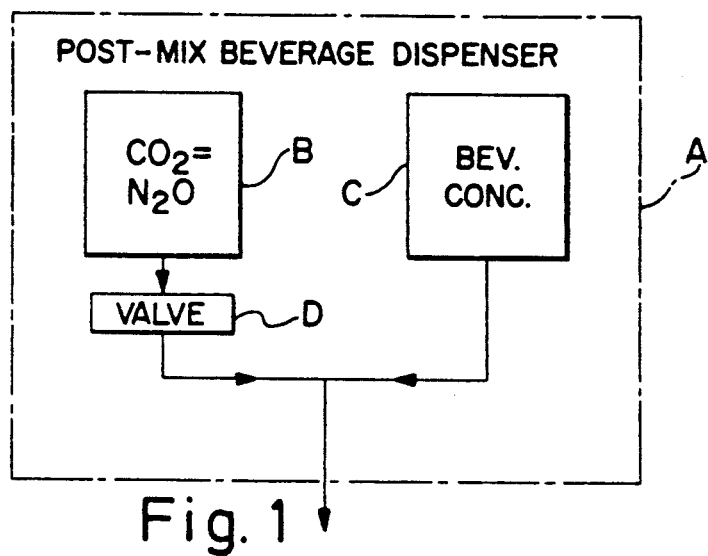
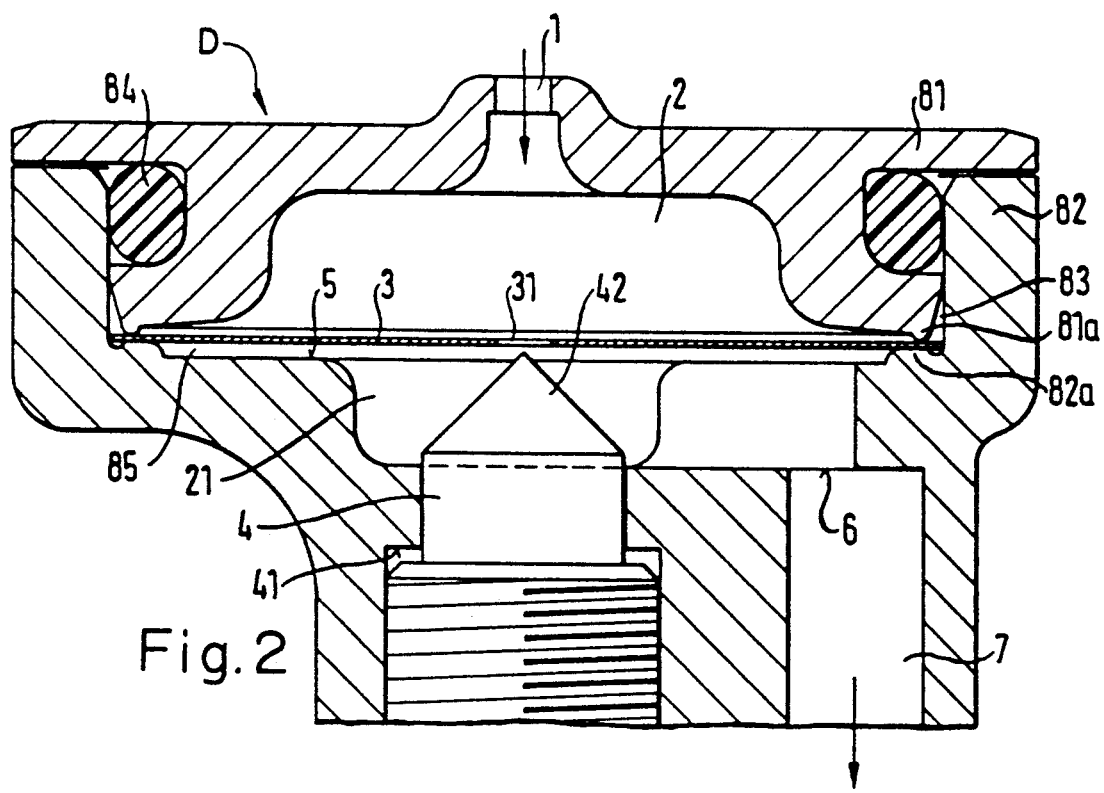

FLOW-CONTROL VALVE ESPECIALLY FOR GASIFIED LIQUIDS

This application is a continuation of application Ser. No. 07/745,390, filed on Aug. 15, 1991, now abandoned.

BACKGROUND OF THE INVENTION

The present invention relates to a flow-control valve especially for gasified liquids, for example, for dispensing portions of carbonated water from a storage container for mixing with beverage concentrates in a post-mix beverage-vending machine.

Such a control valve serves to maintain constant, flow quantities per unit of time, in order to achieve high accuracy of the volume of liquid to be dispensed in conjunction with a time limit for dispensing. For example, in beverage-vending machines by means of which refreshment drinks are blended from carbonated water and beverage concentrates, and then presented for consumption, the given blending ratio of the two components must be maintained as precisely as possible, or otherwise variations in taste will occur which affect the quality of the post-mix drink.

A volumetric dosing system is generally employed for the beverage concentrates to be blended in relatively small quantities, thereby again attaining high accuracy in the volumes dispensed.

In order to obtain the requisite accuracy in dispensed volume of the carbonated water and thus to attain the desired blending ratio, the two components determining the volume, namely, the flow quantity and the inlet flow period, must be determined as accurately as possible. The period of flow can be relatively well controlled by means of accurately timed opening and closing valves, although the closing and opening processes can present erroneous values for short dispensing periods.

Control of the flow quantities is considerably more problematic. Briefly occurring variations in pressure and temperature must be considered as well as the fact relative to gasified fluids that the fluid-gas mixture has a tendency to degas in the event of pressure loss, turbulent flow, or heating in the area of the flow-control valve.

In beverage-vending machines the carbonated water is blended in a so-called carbonator from water and $CO_2$ gas, then stored under pressure and cooled preferably to near the freezing point. Considerable pressure variations arise during the dispensing of carbonated water. Dispensing is carried out in regions of less than atmospheric and hence steady pressure. During long rest periods the flow-control valve is warmed; through the dispensing of carbonated water it is cooled to less than 0° C. High performance standards, however, are expected from such a control valve. Moreover, as an object for commercial production, it should also be inexpensive.

An assembly for mixing liquids using a pressure-independent flow-control valve is already known from German Patent DE 34 30 953. The flow-control valve includes a cylindrical chamber containing a moveable piston driven by the release energy of a spring.

The flowing medium streams through a central hole in the piston to an outlet in the cylinder which is partially covered by the control edge of the piston. The spring counters the force of the medium and applied working pressure. A gap is provided between piston and cylinder with a sealing function. The gap, therefore, is narrow with tight tolerances. Accumulations of dirt between piston and cylinder disturb the control function and lead to erroneous outputs or to breakdown of the assembly. In addition, the relatively complex construction of the conventional control valve with a number of other moveable parts involves the risk of breakdown of the entire assembly if the operational capability of even one single part is adversely affected.

SUMMARY OF THE INVENTION

In view of these facts it is a primary object of the present invention to create a compactly constructed flow-control valve that contains only a small number of individual moveable parts.

A flow-control valve that fulfills these requirement is characterized, according to the invention, in that the interior of the valve broadens out from an inlet to a chamber in which a pierced membrane defining a central orifice is arranged at right angles to the direction of water flow, a pin being arranged in the chamber on the opposite side of the membrane to the inlet in the vicinity of the orifice in such a way that water flowing into the chamber passes through the orifice in the membrane, pressing it in the direction of the pin.

The invention is characterized by a number of advantages. The valve contains only one moveable part, namely the membrane, which in contrast to the conventional piston is not freely moveable but stretched across the body of the valve.

The membrane has practically no wear and thus ensures long life for the valve. The relatively low mass of the membrane produces a very short address and start-up time.

The valve can be compactly and—on account of the simple design—inexpensively constructed. The compact structure is particularly evident when the valve consists of only two housing components, where a first housing component with the inlet in its interior forms the chamber adjoining the inlet as well as the circular space for the membrane, and where a second housing component with the outlet in its interior forms a space open to the outlet as well as the bearing for the pin and the counter-bearing for the membrane.

A further advantageous construction format is specially characterized in that the chamber has on the side opposite the inlet a bearing support, against which the membrane presses at a given pressure of inflowing water. This enhances the spring stiffness of the membrane. Plastic deformation of the membrane, which would limit the capability of the valve, is prevented.

The pin is advantageously mounted orthogonally to the membrane and adjustably. The adjustable mounting permits the compensation of production tolerances.

In a further advantageous construction format according to the invention, the pin has a stop which limits its adjustable travel in the direction of the membrane. This prevents the pin from contacting the membrane, even at maximum pressure of the inflowing water which could reduce its capability or destroy the membrane.

A further benefit is that the pin has a conical tip in the vicinity of the orifice in the membrane, particularly with an angle of 90°. With this form of pin construction the influence of possible aeration of the water by $CO_2$ and temperature dependence is so small that a given tolerance in the quantity dispensed is maintained.

Particularly beneficial in terms of flow mechanics is a construction format where the chamber inside the valve has a circular cross-section in the membrane area and the orifice is located in the center of the membrane. Thereby the membrane has a circumferential support at a given distance from its circular outer edge.

A further advantageous construction format of the valve is specially characterized in that the chamber extends to the opposite side of the membrane from the inlet and forms a space opening to an outlet. This space receives the water flowing through the hole in the membrane and is so constructed depending on the diameter of the outlet that the water creates a given backpressure and emerges from the valve as a focussed jet. This is also achieved by having the outlet emerge into an outlet tube whose diameter is larger than that of the outlet itself.

A further advantageous construction format is specially characterized in that the outlet is angled against the flow direction of the water. The angle in particular is 90°. Diverting the flow direction of the water delays outlet speed and hence also reduces the generation of noise.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitative of the present invention and wherein:

FIG. 1 is a mechanical block diagram illustrative of a post-mix dispenser which includes the present invention.

FIG. 2 is a cross-sectional view through the flow control valve of the present invention.

DETAILED DESCRIPTION OF PREFERRED EMBODIMENT

Referring now to the drawings, FIG. 1 depicts in block diagram form a post-mix beverage dispenser A including a storage container B of carbonated water comprising a mixture of carbon dioxide ($CO_2$) and water ($H_2O$) and a container of beverage concentrates C. The carbonated water is fed out by means of a flow control valve D, the details of which are shown in FIG. 2, for mixing with a volume of beverage concentrate where is it then presented for consumption. The details of the flow control valve D will now be considered.

The interior of the valve shown in FIG. 2 broadens from an inlet opening 1 to a chamber 2. In the construction format as shown, the transitional stage between inlet opening 1 and chamber 2, which is circular at least in the area of the membrane 3, and the chamber wall have a curved profile. Such a shape without sudden volume change prevents any significant outgassing of gasses contained in the water.

The membrane 3 is arranged orthogonally to the direction of flow of the incoming water and includes an advantageous central orifice 31, whose diameter is preferably smaller than or equal to the diameter of the inlet opening 1.

On its side opposite the inlet opening the chamber forms a space 21 in which a pin 4 protrudes. The pin 4 is located in the extension of the path leading from the inlet opening 1 through the orifice 31 in the membrane 3.

The pin 4 has an advantageously conical tip with an angle of 90° in the area of the hole in the membrane. It can be mounted adjustably along an axis orthogonal to the membrane and is constructed as an adjustable screw. Adjustment travel in the direction of the membrane is limited by a stop 41.

By means of the pin the working point of the valve is adjusted. The working point for a given distance between the (loaded) membrane and its particularly conical surface in the area of the membrane orifice is essentially determined by the diameter of the membrane orifice, the stiffness of the membrane and the position of the membrane inside the chamber. Adjusting the pin 4 permits only a narrowly limited change to the control range of the valve; the adjustment serves primarily to compensate any existing production tolerances.

The membrane 3 is supported circumferentially at a given distance from its circular outer edge. The circular or ring-shaped bearing for the membrane is formed in part by the first housing component 81 shown at the top of the drawing and in part by the second housing component 82 shown lower in the drawing. The membrane 3 is stretched by both housing components, whereby the housing components form a free space 83 for the circular outer edge of the membrane in the area of the membrane bearing. Should inflowing water press against the membrane, the latter moves towards the pin 4 in the area of its central hole and upwards in the area of the free space 83 (in the drawing) formed by the housing components.

Both housing components 81, 82 are so shaped in the area of the membrane bearing that they support the movement of the membrane under the effect of pressure changes occurring at the membrane. For example, the first housing component 81 has the rounded shape shown in the drawing in the area of the membrane bearing at the foot of its outer wall 81a, which simultaneously forms one wall of the free space 83. A correspondingly rounded shape is shown by the second housing component 82 at the side of a horizontal membrane bearing 82a facing the center of the valve.

Should the inflowing water exceed a given pressure, the membrane 3 is supported on a bearing 5 located on the opposite side of the membrane 3 to the inlet opening 1. This increases the spring stiffness of the membrane 3; its plastic deformation that could limit or destroy its capability is avoided. At the same time the control range of the valve is extended.

The chamber 2 in the flow-control valve extends to the opposite side of the membrane 3 from the inlet opening and forms a space 21 that opens to an outlet opening 6. The pin 4 is located in the center of this space 21.

Immediately next to the membrane 3 the space 21 forms a horizontal disk-shaped area 85 which is bounded in the upwards direction by the membrane in its rest position and in the downwards direction by the bearing 5. The height of the area 85 corresponds to the membrane bowing at a given target pressure. The space formed by the area 85 permits small dirt particles to be rinsed out of the water through the pump-like motion of the membrane 3 in response to pressure changes. The space 21 receives the water flowing out through the orifice 31 in the membrane 3 and the tip of the pin 4 and guides it to the outlet opening. The space is so proportioned that the water develops a given back-pressure and thus gas bubbles formed by gas separating from the water are carried out with it.

The outlet opening 6 is located in a peripheral area of the space 21 and is thus angled against the vertical direction of water flow. In particular the outlet opening is angled at 90° with respect to the direction of water flow.

The outlet opening communicates into an outlet tube 7 that preferably has a diameter larger than that of the outlet opening 6. The narrow passage formed by the outlet opening 6 as well as the diversion of the water flow delays the emergence of the water and reduces the outflow speed. This also reduces the noise developed by the outflowing water.

The mentioned ratio of the diameters of the outlet opening 6 and the outlet tube 7 has the effect that the emerging, decelerated water is focussed and fills the entire width of the outlet tube 7, thus preventing the issuing jet from spraying.

The membrane 3 assumes the function of the conventional piston and spring. In the flow-control valve according to the invention, control is exercised by a ring-shaped gap between the membrane orifice 31 and the conical surface of the pin 4. The pressure of the inflowing water inside the valve moves the membrane 3 in the direction of the conical surface of the pin 4, thereby adjusting the ring-shaped gap independently from the water pressure and the elastic strength of the membrane 3. This forms the opening surface for the water.

The control process also depends on the diameter of the membrane orifice 31.

Control first begins when the opening surface through the ring-shaped gap is less than the surface of the membrane orifice.

The compact construction of the flow-control valve is also evident in that it consists simply of two housing components, that is a first housing component 81 with the inlet opening 1 and a second housing component 82 with the outlet opening 6. The first housing component 81 forms in its interior the chamber 2 adjoining the inlet opening 1 as well as the circular bearing for the membrane 3. The second housing component 82 forms in its interior the space 21 open to the outlet opening 6 as well as the bearing for the pin 4 and the counter-bearing for the membrane 3. The outlet tube 7 is advantageously integrated in the second housing component 82 as shown in FIG. 2.

Both housing components 81, 82 are sealed against each other in the area of the ring-shaped bearing for the firmly stretched membrane. The two housing components are further sealed by a seal ring 84.

The flow-control valve can be set for pressure ranges, for example, of 4 +/−1 bar and 5 +/−1 bar. Other pressure ranges or flow quantities can be achieved through appropriate changes to the membrane hole.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. In a post-mix beverage dispenser of flow-control valve for dispensing portions of carbonated water from a storage container for mixing with beverage concentrates, the improvement comprising:
    a valve housing, the interior of which broadens from an inlet opening to a chamber of a membrane with an orifice therein arranged orthogonally to the direction of the inflowing water, a pin with a conical tip defining a continuous conical surface aligned with the orifice and disposed in the chamber on the opposite side of the membrane to the inlet opening in close proximity to the orifice such that the water flowing into the chamber passes through the orifice in the membrane and displaces the membrane in the direction of the pin to change the effective size of the orifice.

2. A flow-control valve as in claim 1, wherein the chamber has on the opposite side to the inlet opening a bearing against which the membrane presses in response to a certain pressure of inflowing water.

3. A flow-control valve as in claim 1, wherein the pin is mounted orthogonally to the membrane and is adjustable along an axis orthogonal to the membrane.

4. A flow-control valve as in claim 3, wherein the pin is constructed as an adjustable screw.

5. A flow-control valve as in claim 4, wherein the pin has a stop limiting its adjustment travel in the direction of the membrane.

6. A flow-control valve as in claim 1, wherein the conical tip has an angle of 90°.

7. A flow-control valve as in claim 1, wherein the chamber inside the valve housing in the area of the membrane has a circular cross-section and that the orifice is arranged in the center of the membrane.

8. A flow-control valve as in claim 7, wherein the membrane is supported circumferentially at a given distance from its circular outer edge.

9. A flow-control valve as in claim 1, wherein the chamber extends to the opposite side of the membrane from the inlet opening and forms a space communication with an outlet opening.

10. A flow-control valve as in claim 9, wherein the outlet opening is angled with respect to the flow direction of the water.

11. A flow-control valve as in claim 10, wherein the outlet opening is angled at 90° with respect to the flow direction of the water.

12. A flow-control valve as in claim 11, wherein the outlet opening communicates into an outlet tube with a diameter larger than that of the outlet opening.

13. A flow-control valve as in claim 1, wherein the housing includes a first housing component with the inlet opening and a second housing component with the outlet opening, the first housing component forming in its interior the chamber adjoining the inlet opening as well as a circular bearing for the membrane the second housing component forming in its interior a space open to the outlet opening as well as a bearing for the pin and a counter-bearing for the membrane.

14. A flow-control valve as in claim 13, wherein an outlet tube is integrated into the second housing component.

* * * * *